US005966715A

United States Patent [19]
Sweeney et al.

[11] Patent Number: 5,966,715
[45] Date of Patent: *Oct. 12, 1999

[54] APPLICATION AND DATABASE SECURITY AND INTEGRITY SYSTEM AND METHOD

[75] Inventors: Christopher Lee Sweeney, Broomfield; Scott A. Stodghill, Evergreen; Kurt A. DeShazer, Littleton; Aravindan Marimuthu, Aurora, all of Colo.

[73] Assignee: CSG Systems, Inc., Englewood, Colo.

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,730

[22] Filed: Dec. 29, 1995

[51] Int. Cl.$^6$ ...................................................... G06F 17/30
[52] U.S. Cl. .............................................. 707/203; 707/9
[58] Field of Search ..................................... 395/600, 700, 395/608, 726, 490; 364/300, 200; 380/4; 707/203, 9

[56] References Cited

U.S. PATENT DOCUMENTS

| | | | |
|---|---|---|---|
| 4,558,413 | 12/1985 | Schmidt et al. | 364/300 |
| 4,651,279 | 3/1987 | Suzuki | 705/18 |
| 4,698,752 | 10/1987 | Goldstein et al. | 395/608 |
| 4,731,734 | 3/1988 | Gruner et al. | 711/202 |
| 4,791,565 | 12/1988 | Dunham et al. | 364/200 |
| 4,924,378 | 5/1990 | Hershey et al. | 364/200 |
| 4,937,863 | 6/1990 | Robert et al. | 380/4 |
| 5,023,907 | 6/1991 | Johnson et al. | 380/4 |
| 5,127,099 | 6/1992 | Zifferer et al. | 340/825.34 |
| 5,138,712 | 8/1992 | Corbin | 395/700 |
| 5,155,847 | 10/1992 | Kirouac et al. | 395/200.51 |
| 5,163,147 | 11/1992 | Orita | 395/600 |
| 5,204,897 | 4/1993 | Wyman | 380/4 |
| 5,220,604 | 6/1993 | Gasser et al. | 380/23 |
| 5,261,042 | 11/1993 | Brandt | 345/333 |
| 5,261,102 | 11/1993 | Hoffman | 395/186 |
| 5,263,165 | 11/1993 | Janis | 711/163 |
| 5,265,211 | 11/1993 | Miller | 395/490 |
| 5,274,806 | 12/1993 | Hill | 707/10 |
| 5,276,901 | 1/1994 | Howell et al. | 707/9 |
| 5,280,612 | 1/1994 | Lorie et al. | 707/8 |
| 5,280,619 | 1/1994 | Wang | 395/726 |

(List continued on next page.)

OTHER PUBLICATIONS

Cellary et al. "Locking in DAG–Structured Databases", Microprocessing & Microprogramming, v39, n2–5, p161–4, Sep. 9, 1993.

Perelman–Hall, David "Directed Acyclic Graph Unification:An Object–oriented Approach to Building Constraint Systems", Dr. Dobb's Journal, v20, n4, p44(8), Apr. 1995.

Eich, M.H. "Graph Directed Locking", IEEE Transactions on Software Engineering, v14, n2, p133–40, Feb. 1, 1988.

Feldman, Stuart I. "Make—A Program for Maintaining Computer Programs", Software—Practice and Experience, v9, p255–265, 1979.

International Search Report, PCT/US96/20125, Apr. 1, 1997.

Lubkin, David C., "DSEE: A Software Configuration Management Tool", Hewlett Packard Journal, v.42, n3, pp77(7), Jun. 1991.

*Primary Examiner*—Paul R. Lintz
*Assistant Examiner*—Charles L. Rones
*Attorney, Agent, or Firm*—Baker & McKenzie

[57] ABSTRACT

A system and method for ensuring the security and integrity of applications and databases. The present invention provides a user management system which allows permissive access to applications and stored procedures using a directed acyclic graph structure which allows users or groups of users to have the capability to access the desired applications and stored procedures. Also provided is a version control management system which ensures a user is using the desired or current version of an application and also provides a framework for a developer to develop an application and install it on the system.

17 Claims, 5 Drawing Sheets

U.S. PATENT DOCUMENTS

| | | | |
|---|---|---|---|
| 5,317,729 | 5/1994 | Mukherjee et al. | 707/3 |
| 5,321,841 | 6/1994 | East et al. | 395/677 |
| 5,325,478 | 6/1994 | Shelton et al. | 707/507 |
| 5,375,244 | 12/1994 | McNair | 395/726 |
| 5,396,621 | 3/1995 | MacGregor et al. | 345/347 |
| 5,432,934 | 7/1995 | Levin et al. | 395/186 |
| 5,440,730 | 8/1995 | Elmasri et al. | 707/203 |
| 5,442,791 | 8/1995 | Wrabetz et al. | 395/674 |
| 5,446,903 | 8/1995 | Abraham et al. | 395/728 |
| 5,481,700 | 1/1996 | Thuraisingham | 707/9 |
| 5,493,682 | 2/1996 | Tyra et al. | 395/703 |
| 5,495,610 | 2/1996 | Shing et al. | 395/200.51 |
| 5,642,503 | 6/1997 | Reiter | 707/8 |
| 5,708,812 | 1/1998 | Van Dyke et al. | 395/712 |
| 5,754,864 | 5/1998 | Hill | 395/712 |
| 5,758,340 | 5/1998 | Nail | 707/9 |
| 5,832,483 | 11/1998 | Barker | 707/8 |

APPLICATION AND DATABASE SECURITY AND INTEGRITY SYSTEM AND METHOD

RELATED APPLICATIONS

This application is related by subject matter to the following, co-pending, co-owned U.S. Patent Applications: U.S. application Ser. No.08/405,766, filed Mar. 17, 1995, "Method and Apparatus for Transaction Processing in a Distributed Database System"; U.S. application Ser. No. 08/579,371 filed Dec. 27, 1995, "Billing Statement Rendering System and Method"; each herein incorporated by reference.

TECHNICAL FIELD OF THE INVENTION

This invention relates in general to maintaining the security and integrity of applications and databases.

BACKGROUND OF THE INVENTION

In the past, a user's access to applications has been controlled by the use of passwords. Generally, the password provides a user with access to all applications, with certain files, e.g., personal files, financial files, etc. being protected by a second password. More elaborate access control schemes have used access control lists for applications, databases, and systems. These access control schemes or systems have significant shortcomings, including that they are not very flexible for large user systems, users are provided access to applications and/or databases which are outside the scope of their work, and thus a user may disturb these applications or databases, and with password protection, the security may relatively easily be breached.

With known systems and applications, there exist problems with identifying and controlling which version of a particular application a user has access to and/or is using. In some systems, when a user is interfacing with another user, support personnel, etc., often it is required that the user verbally ask what version the other is using. Also in many cases, a new version is simply installed over the top of an old version, and new users access the new version automatically. This presents problems in that, if the new version has a significant bug, then the old version needs to be reinstalled, which is confusing and time consuming. Also, this does not allow the testing of the new version before it is installed to all users.

With known systems and applications, problems exist in moving a particular application from a developer to the system. Typically developers customize their systems. This presents problems in moving the developed application from the developer to the system, particularly in relation to troubleshooting the application after it has been installed on the system. Also, problems exist with regard to transferring the files that are necessary for the application to run. Frequently, not all of the desired files are transferred, or the files are transferred in an undesired format.

SUMMARY OF THE INVENTION

In view of these and other shortcomings of the prior art, there is a need for a system and method which insures the security and integrity of applications and databases.

It is an object of the current invention to overcome the above described and other shortcomings of the prior art.

It is a further object of the current invention to provide a security system which is secure, flexible, and allows the user to access only those applications or stored procedures which are required for the user to do his work activity.

It is further an object of the present invention to ensure that a user is using the desired, current version of a particular application.

It is another object of the present invention to provide a framework that application developers use to facilitate transfer of the developer's work to the system.

The present invention includes a user management system having a directed acyclic graph structure to provide a user or group permission to access applications, stored procedures, etc. The present invention also includes a version control management system which insures a user is using the desired current version of an application and provides a format for an application developer to facilitate the development and implementation of an application onto a system.

BRIEF DESCRIPTION OF THE DRAWINGS

A more complete understanding of the present invention and the advantages associated therewith may be acquired by referring to the accompanying drawings wherein.

DETAILED DESCRIPTION OF THE INVENTION

Figure 1:
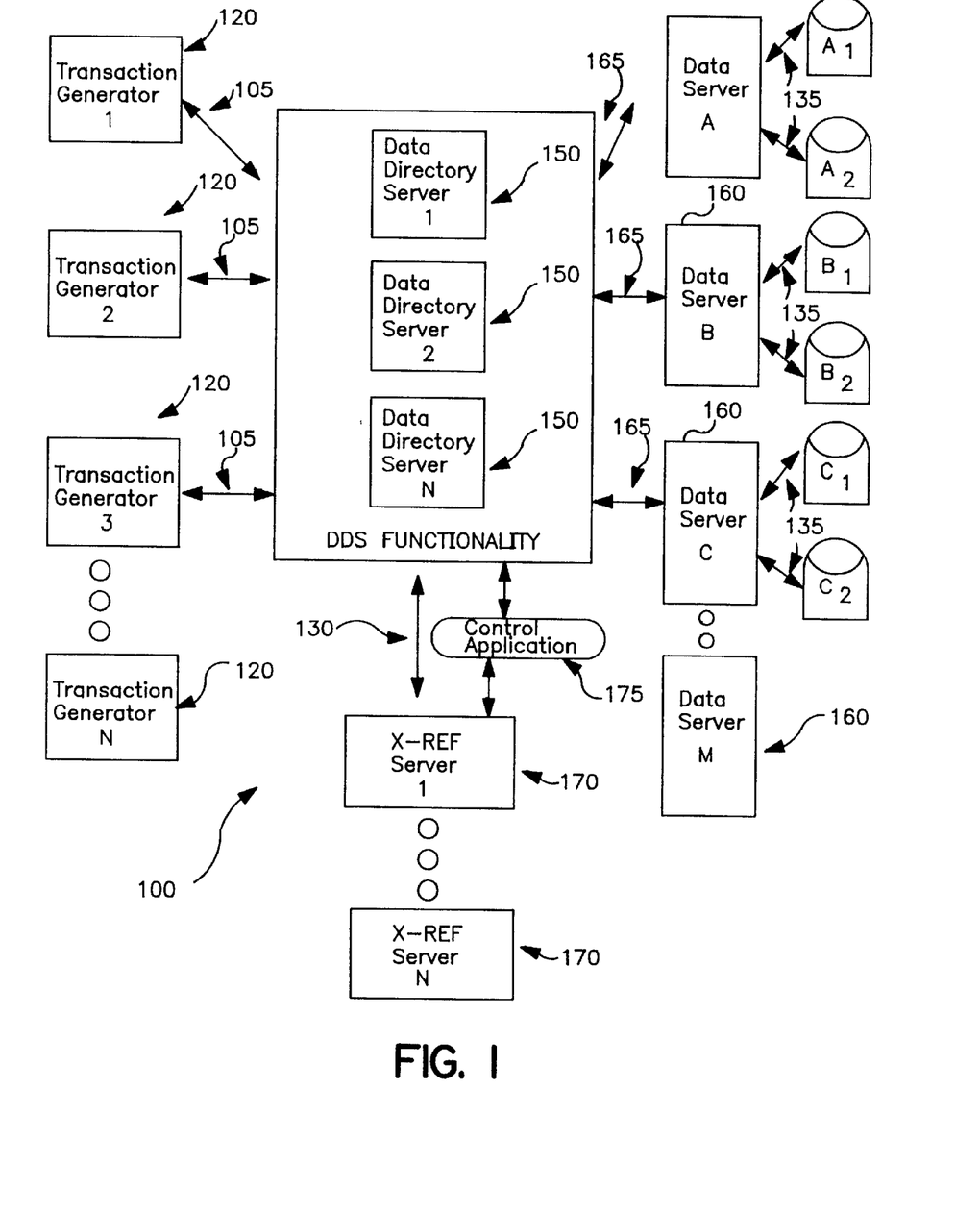
FIG. 1 is a block diagram depicting the architecture of one embodiment of a system for use in the present invention.

The present inventive system and method is preferably utilized in a system having an architecture as shown in U.S. application Ser. No. 08/405,766, filed Mar. 17, 1995, entitled "Method and Apparatus for Transaction Processing in a Distributed Database System"; herein incorporated by reference. FIG. 1 generally illustrates this system and architecture.

While the various aspects and embodiments of the invention are capable of use in various systems and types of distributed database systems, for simplicity, the system will be described in connection with a Subscriber Management System (SMS) 100 having a distributed database. Such system is useful for, among other things, cable system operations. However, the inventive system and method is not limited to this described system. As shown in FIG. 1, the SMS comprises a plurality of transaction generators labeled 1 through N, where N=any integer. Each transaction generator 120 is connected via a two-way communication link 105 to one (or more) data directory servers (DDS) 150. The present invention may include any number of data directory servers 150, but includes at least one. Each data directory server 150 in turn is connected via a two-way communication link 165 to multiple data servers ($DS_A$–$Ds_m$) 160. Each data server 160 is in turn connected to one or more databases either as components of a single subsystem (processor and database) or through a two way communication link 135. Additionally, each DDS 150 is connected via a two-way communication link 130 to one or more cross reference servers (X-$ref_1$–X-$ref_n$, where N=any integer) 170.

FIG. 1 indicates a block of 1 through N, (where N=any integer) DDSs 150 representing DDS functionality within the SMS. It is to be understood that, although not shown, connections between transaction generators 120 and DDSs 150 as well as those between data servers 160 and DDSs 150 are preferably individual connections rather than to a grouping of DDSs. For example, Transaction Generator 1 is separately connected to each of the DDSs as is Data Server A. Alternatively, however, DDS functionality may be grouped with common connections to transaction generators 120 and/or data servers 160 as indicated in FIG. 1 so long as proper control between DDSs 150 is maintained.

Additionally, the SMS system 100 includes at least one control application 175 for communication between the DDS(s) 150 and a human operator and/or another SMS process. The control application 175 provides, among other functionality, a means for updating the internal rules used by the DDS(s) 150.

When a transaction is generated by a transaction generator 120 and sent to a data directory server 150, the data directory server 150 determines the appropriate server 160 for execution of the transaction. Preferably, this is accomplished by the DDS 150 consulting the internal rules and identifying the arguments associated with the transaction.

The SMS 100 of the present invention is designed to manage a very large number of On Line Transaction Processing (OLTP) transactions occurring within the system. The SMS 100 of the present invention provides users with the ability to query across the entire database from any client in the system. Similarly, each of the users may update data located anywhere within the SMS 100.

The transaction generators 120 in the system of the present invention may be any devices capable of receiving input from a user and transmitting that input to the Data Directory Servers (DDSs) 150. This type of device is often referred to as a client and these terms are used interchangeably herein. These devices may be dumb terminals (i.e., incapable of performing local processing) or they may have various processing capabilities of their own. Examples of transaction generators include, without limitation, PCS, RISC-based workstations and local area networks. In typical applications, there will be a large number of transaction generators 120. Thus, the SMS 100 is designed as an open platform environment which is hardware independent. The transaction generators 120 may be homogeneous in terms of interface and operation or they may be heterogeneous. In other words, all transaction generators 120 may be of one type or there may be a variety of devices interacting with the DDSs 150. It is also possible to permit customer interaction with the SMS 100 through an ARU/ANI (Automated Interactive Voice Response Unit/Automatic Number Indicator) (not shown). In this case, much of the processing may be driven by the telephone number retrieved by the ANI when the customer calls into the system.

The DDSs 150 of the present invention function as the middle tier of a three tier client/server architecture. As illustrated in FIG. 1, more than one DDS 150 may exist within the SMS 100. In such case, each of the DDSs 150 has communication access to all of the other DDSs 150 as well as to each of the data servers 160. The DDSs 150 serve three primary functions. After receiving a client request, the selected DDS 150 first locates the appropriate server 160 for execution of the request, it then submits the client request to the selected server and finally the DDS 150 returns the result to the submitting client 120.

Transaction generators 120 requesting information from the SMS databases must connect to a DDS 150 prior to accessing data. Through the use of internal rules, the DDSs 150 determine where a remote procedure should run in order to complete processing of a transaction. Access to the DDSs 150 may be efficiently implemented through the use of remote procedure calls (RPCs) which are identified in tables internal to the DDS 150. Any of a large number of standards for such RPCs may be used with the current invention.

The DDS(s) 150 are preferably open server applications that provide a mechanism to direct any data request associated with a generated transaction to a data server 160 that can service the transaction generators' requests. Specifically, the DDSs 150 may be open servers comprising the same or similar hardware as the data servers 160 of the present invention. Alternatively, the DDSs 150 may be configured differently from the data servers 160. The DDSs 150 function to analyze the client's data request transaction and, based upon the transaction type and a set of rules, directs the request to the appropriate data server 160. The types of transactions which are received at the DDSs 150 are based upon a set of stored procedures recognizable to the DDSs 150 and available to the transaction generators 120. The DDSs 150 communicate with a plurality of data servers 160 each accessing one or more storage devices. In a preferred embodiment of this invention the data servers 160 are Sybase SQL (Structured Query Language) Servers which execute Sybase remote procedure calls (RPC). This invention is not, however, necessarily limited thereto and the servers may be of any type so long as the stored procedures are designed for processing by the particular server and the associated database which are selected. It is possible to employ any number of servers 160, transaction generators 120 and DDSs 150 in the SMS 100 of this invention so long as the proper number of communication channels can be supplied and supported.

The data servers 160 maintain the customer data and are accessible by each of the transaction generators 120 through a DDS 150. In a typical implementation, the data servers 160 are SQL devices which are capable of executing the RPCs transmitted by a DDS 150. The databases making up the enterprise can be either homogenous or heterogeneous. In a homogeneous environment, particular protocols for accessing each of the databases are consistent throughout the enterprise. Conversely, in a heterogeneous environment, the particulars of database access vary within the enterprise. In a heterogeneous environment, it is often desirable, however, to render any differences in requirements within the enterprise transparent to user working at the client site. That is, a user should not be aware of any database heterogeneity and a user request should be processed in a standard manner across all resources.

The databases which are accessed in a distributed system may all be located together or they may be physically apart. They may be at the client location or they may be at an alternate site. Databases may be relational databases such as SYBASE (a trademark of Sybase, Inc.) or they may be as simple as a series of flat files.

In FIG. 1, it can be seen that the DDSs 150 interface with a control application 175. The control application 175 functions to allow a system operator to store, update and modify stored procedures available to transaction generators 120. This is typically accomplished by downloading the update to the X-Ref Server 170 which loads the new rules base into the DDSs 150 at DDS startup.

The SMS system also includes one or more X-Ref Servers 170. The X-Ref Servers 170 function as a resource available to the DDSs 150 for determining where specific data resides in the system and for storing the rules base which is loaded into the DDSs 150 at DDS start-up. The X-Ref Servers 170 contain a variety of global tables which are continually updated as data is added, updated and deleted within the system.

The present inventive system and method may be used on the above described system or on any system having at least one server and at least one database. The inventive application and database security and integrity system and method includes The User Management System (TUMS) and Version Control Management (VCM).

The User Management System (TUMS)

The User Management System (TUMS) uses a directed acyclic graph mechanism to manage the users and their authorization to execute specific applications. TUMS includes two parts: user administration and capability administration. The user administration part manages the authorized user details and generally provides the ability to:

1. Add a new user.
2. Remove an existing user.
3. Assign a user to a database group.
4. Modify a user's database group.
5. Modify a user's data such as FirstName, LastName, LoginName, Password, default BusinessUnit, Department, JobType, PhoneNumber, list of applications authorized to execute, etc.
6. Select a list of users who meet certain criteria, such as clerks in a certain department.
7. Modify the attributes of all the selected users.

The capability administration part manages the database group attributes and authorizes permissions for the capabilities. Capability administration provides the ability to:

1. Add a new group by cloning from other groups.
2. Modify the name of an existing group.
3. Add a capability.
4. Remove an existing capability.
5. Make a capability to contain other capabilities, provided they are not cyclic. (For example, A contains B, B contains C. It is not allowed to have C contain A or B. The capability must go in one direction as A→B→C).
6. Assign execute permission, such as REVOKE or GRANT database permission, to a capability.
7. Propagate the execute permission to all the shared capabilities (For example, in A→B→C relationship, A's GRANT permission will propagate that information to B, and B will pass it to C).
8. To avoid ambiguous permissions on shared capabilities. For example, if the capabilities are then, B is shared by 2 capabilities (A and Y). Suppose A grants permission and Y revokes permission. In this case, B gets grants permission because at least one of parent capability has Grant permission.
9. Expand or collapse the shared capabilities from a given capability.
10. Locate any capability used in the graph.
11. Show whether a capability is: at the Root level (i.e. No parent relationship), having only one link to the top or having multiple parent relationships.

"Capability" relates to an abstraction of access to system resources. Capabilities are the means by which groups of users are either granted or denied access to system services. Capabilities are the means in which permissions are assigned to system resources. Capabilities are also a means for extracting low level details into higher level entities that managers can manipulate. Capabilities may contain capabilities which may in turn contain other capabilities.

Figure 2:
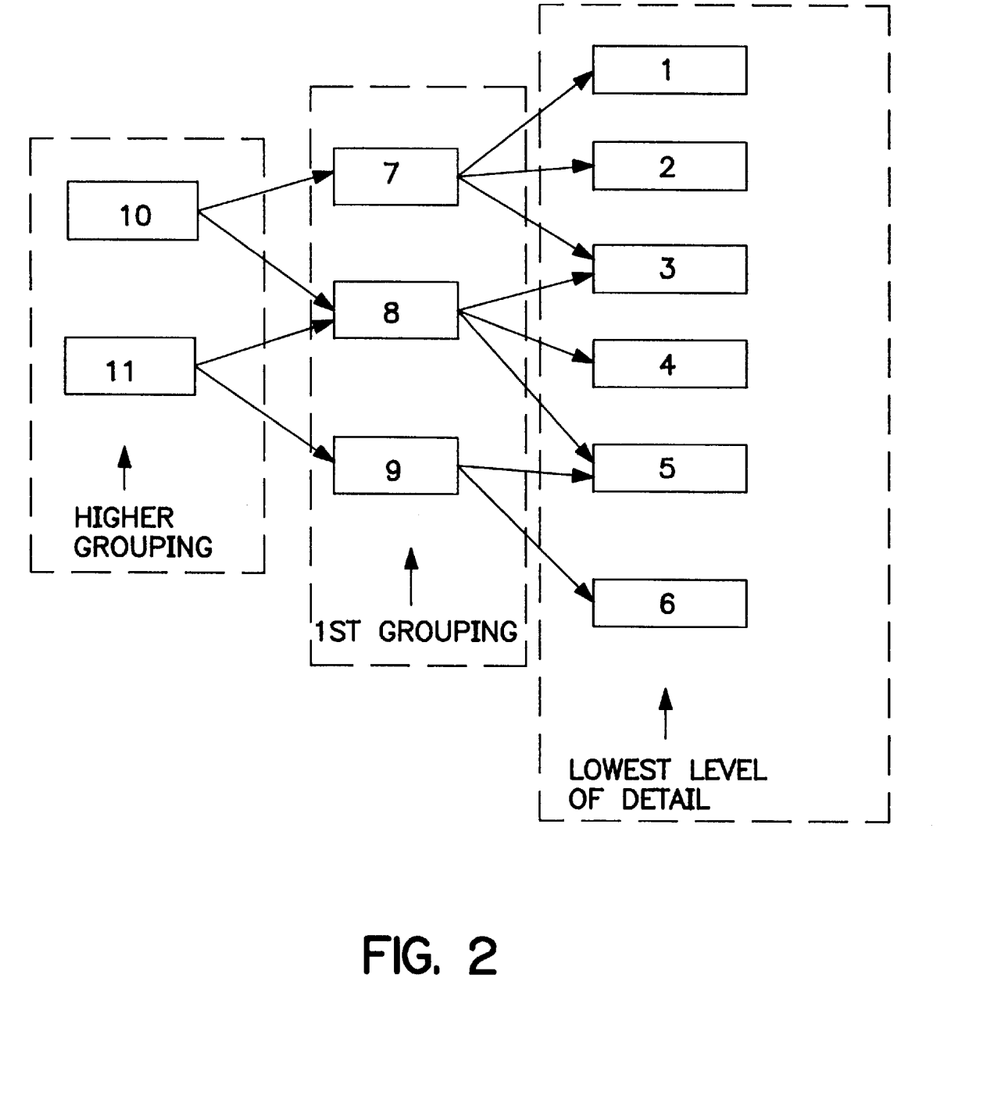
FIG. 2 shows a simplified Directed Acyclic Graph (DAG).

FIG. 2 shows a simplified Directed Acyclic Graph (DAG). A Directed Acyclic Graph is a collection of nodes and "edges" (lines) that connect them. As shown, the edges have a direction to them, i.e., they are directed. The nodes contain the capabilities which may contain other capabilities. FIG. 2 includes nodes 1 through 11. Nodes 1 through 6 represent the lowest level of detail and are generally individual stored procedures. A stored procedure is a single function that executes on the database server, the lowest level of execution control. The first grouping relates to collections of stored procedures that perform some logical task. The higher grouping relates to an application level. This hierarchy provides control over the permissions. Thus, the Directed Acyclic Graph provides a structure and means to set permissions which control when a user can work with applications, tasks or stored procedures.

The directed acyclic graph requires at least two levels to operate. Typically, the directed acyclic graph has between two and five layers.

Preferably, there is no access to raw tables. Database systems such as Sybase have the capability to turn off all access to raw tables and require that a stored procedure be used to access it. It is preferred to use a stored procedure, since the stored procedure, utilizing the directed acyclic graph, has the ability to check to determine whether the user has permission to access the raw tables via the stored procedure.

It is preferred that individual users be grouped according to business unit, level of responsibility or authority, etc. Users are preferably grouped to simplify the task of managing permissions. It is preferred that a user belong to only one group.

An example will help illustrate the structure and application of the Directed Acyclic Graph. Assume nodes 1, 2 and 3 provide permissions to low level stored procedures that relate to reading customer data, e.g., node 1 provides the permission to access a stored procedure which accesses a customer's name and address; node 2 provides the permission to access a stored procedure which accesses the customer's billing information; and node 3 provides the permission to access a stored procedure which accesses a list of products or services the customer uses. Assume nodes 3, 4 and 5 provide permissions to low level stored procedures which relate to writing customer data. Assume node 7 provides permissions related to the task of reading customer data and that node 8 provides permissions related to the task of writing the customer data, e.g., billing customers. Thus, clerks in the accounting department may be granted permissions via nodes 7 and 8 which would allow them to access stored procedures relating to nodes 1 through 5. Thus, TUMS would provide a group, such as accounting clerks the permission via nodes 7 and 8 to access the desired stored procedures as noted above.

It would be desired that an accountant would have the capability to access more stored procedures than the accounting clerks. Thus, an accountant may be granted permissions via nodes 10 and 11 to access specific applications relating thereto. This also allows the accountant to access the task granted permissions via node 9 and the stored procedure granted permissions via node 6, in addition to the tasks granted permissions via nodes 7 and 8 and the stored procedures granted permissions via nodes 1–5 which the accounting clerks are granted permissions to. Thus, the accountant would be granted access to the required applications, tasks and stored procedures to develop the accounts receivable, forecast, etc. This is in comparison to the accounting clerks who have a very limited access to applications and stored procedures.

The directed acyclic graph method may be used in a variety of circumstances as illustrated by another example. For a cable system subscriber management system, assume that the customer service and sales representatives (CSSR) are divided into beginner, intermediate, and expert groups. The beginner group would be allowed to and be provided with permissions to access the stored procedures which allow them to order a movie for a customer or answer general questions. An intermediate group would be granted access to additional stored procedures to support a higher level of authority and additional work responsibilities, e.g., to sign-up a new user. An expert group would be granted the permissive right to access even more stored procedures consistent with a high level of authority, e.g., to zero out an account balance.

Also, it may be advantageous to permit a user or group access to an application or stored procedure which reads and presents data, while not permitting access to an application or stored procedure which would update or otherwise change the data.

For example, for an application which utilizes a graphical user interface (GUI), the application accessing a window(s) would be represented by a layer down from the application, i.e., to the right as shown in FIG. 2. If that window accesses other windows, then that represents another layer down. These windows would then access stored procedures, representing another layer down. Thus, in this example there would be at least four layers.

As can be seen, the permissions trickle down, i.e., if a user has permissions as granted by node 10, he is also granted permissions as to nodes 1–5, 7 and 8.

FIG. 2 is a very simplified directed acyclic graph. A large user system, such as a cable operations system, may have thousands of the nodes representing the lowest level of detail, generally individual stored procedures.

Preferably, a group table is formed which includes all groups and is designed to interact with the directed acyclic graph. The group table is designed to lay permissions, i.e., apply yes or no values or grant or deny permission, to the DAG structure by group.

In use, the directed acyclic graph structure is contained in a DAG table. Each time a stored procedure is run, the stored procedure, using login information, determines what group the user belongs to. The stored procedure calls the group table and causes the group table to be meshed with the DAG table. With this interaction of the group table and the DAG table, the stored procedure determines if the specific group is permitted to retain access to the stored procedure. If the specific group is not permitted to retain access to the stored procedure, the stored procedure does not continue to run.

Thus, the group table interacting with the DAG table provides grant or denial of permission to retain access to each application, task, or stored procedure, as discussed above, on a group by group basis. This may be done by specifying a "Yes" (grant of permission) or "No" for each node or by specifying a "Yes" with a default No. Also, as discussed above, the grant of permission flows to lower level nodes connected or related by the edges.

The DAG structure and the group information is preferably included in tables, i.e., the DAG table and the group table, as discussed above. However, the DAG structure and the group information may be incorporated and interacted in any suitable way.

Figure 3:
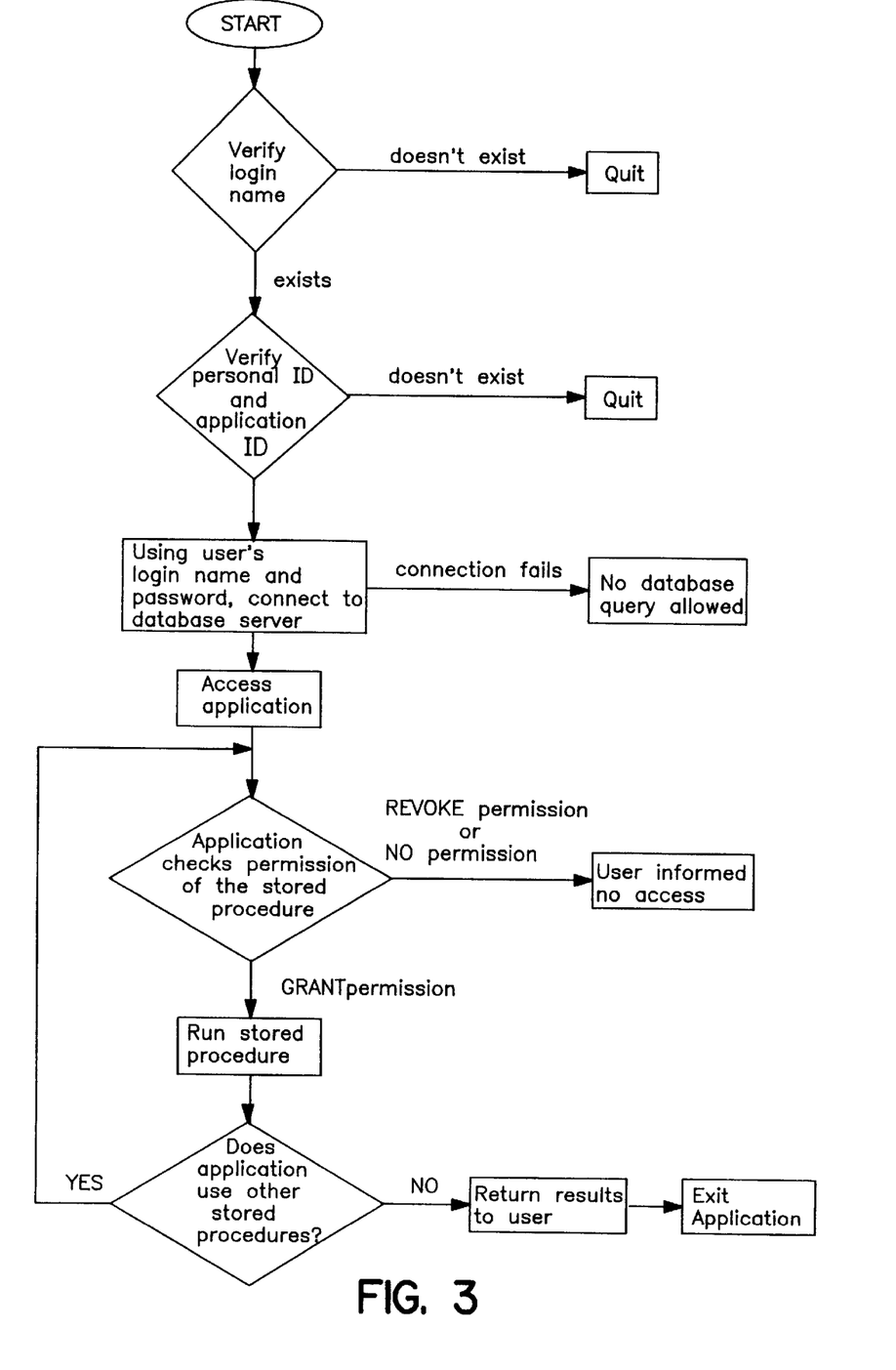
FIG. 3 is a flow chart illustrating, in a broad sense, the verification and access method utilized when a user attempts to access an application.

FIG. 3 shows the steps which occur with TUMS when a user tries to execute an application. First, that person's LoginName is verified against a database. The person's ID and the application's ID are verified to see whether that person is authorized to execute the particular version of the application. If the person is not authorized to run the application, then he/she is not allowed to continue the session. Then, the person's LoginName and Password are used to get a connection to the desired database server. If that fails, the person is not allowed to query the database. Once the person gets proper connection to the database, that person's database group gets identified and verified. Whenever a query to the database is invoked through a stored procedure call, the application gets the database permission for the stored procedure using the person's database group. If the permission for that stored procedure is already granted to the group through TUMS, then the query is passed to the database. This is repeated for each stored procedure. If the permission for that stored procedure is denied or revoked for the group, then the query will not get passed to the database and this information is returned to the caller. If it is a Graphical User Interface (GUI) application, then, perhaps, an icon may set the look and feel accordingly (for example, the icon might get disabled if the permission is not granted). Once the query is completed, the results are returned to the user.

A separate application, identified herein as "SecurityClient", whose purpose is to ensure that the security information is consistent, updated and distributed throughout the system is preferably used. SecurityClient works closely with TUMS and other password change windows. This application loops through all the servers and all the databases to replicate the changes made in the personnel or user_protects table. For example, when a user's password gets changed in TUMS, that change gets updated in the personnel table. The trigger will add a row in another table, security_update. The database's systems tables are preferably not updated at this time. Then, the SecurityClient application takes each entry in the security_update table and updates the database's systems tables for all servers and databases. If for some reason, a server is down, then this application will make an entry in the security_update table with the server information for future processing. This tool can be executed in the background and will run in a continuous mode.

Version Control Management (VCM)

Version Control Management (VCM) provides database security and is a means of ensuring data integrity. VCM provides a means for distributing applications over a network, controlling which version of an application a user is using, and ensuring that the user receives the correct version of the application. Also, VCM provides a technique which ensures that the set of files for an application are present and correct. While preferably VCM includes all of these aspects, each may exist independently of the others. VCM preferably includes two applications, identified herein as "Launch" and "VCMadmin".

Generally, Launch is an application which ensures that a user is using a desired version of an application. The Launch application involves the VCM system from the standpoint of a user starting an application. Generally, "Launch" is an application which a user accesses during the login procedure. Launch uses the user's name and password to connect to a server and, if it can't connect, first it presumes that the user has mistyped his name or password. With the correct name and password, Launch connects to the server and asks the server what set of applications the user is allowed to use. Launch receives a list of applications that the user is allowed to access. The user picks an application and Launch asks the server what version of the application is the correct version for that user. These two steps may be combined into one query or may be two separate queries. Launch then provides an absolute path name to the application and executes that application as a parallel process.

Also, while a user is using an application, Launch checks to ensure that the user is using the correct version, i.e., that a new version has not been released while the user is using the application. Launch asks the server if there are any new versions that are pending, i.e., if a new version has an effective date that is prior to the current date. If Launch determines that a new version exists, it downloads the application in the background.

Additionally, Launch makes sure that all the files necessary for a particular application to run are present, the correct size, and the correct permissions. For example, if a file, necessary for an application, is accidentally deleted, Launch would detect that this file was missing and re-download the missing file before it launches the application, i.e., before the user has access to the application.

Figure 4:
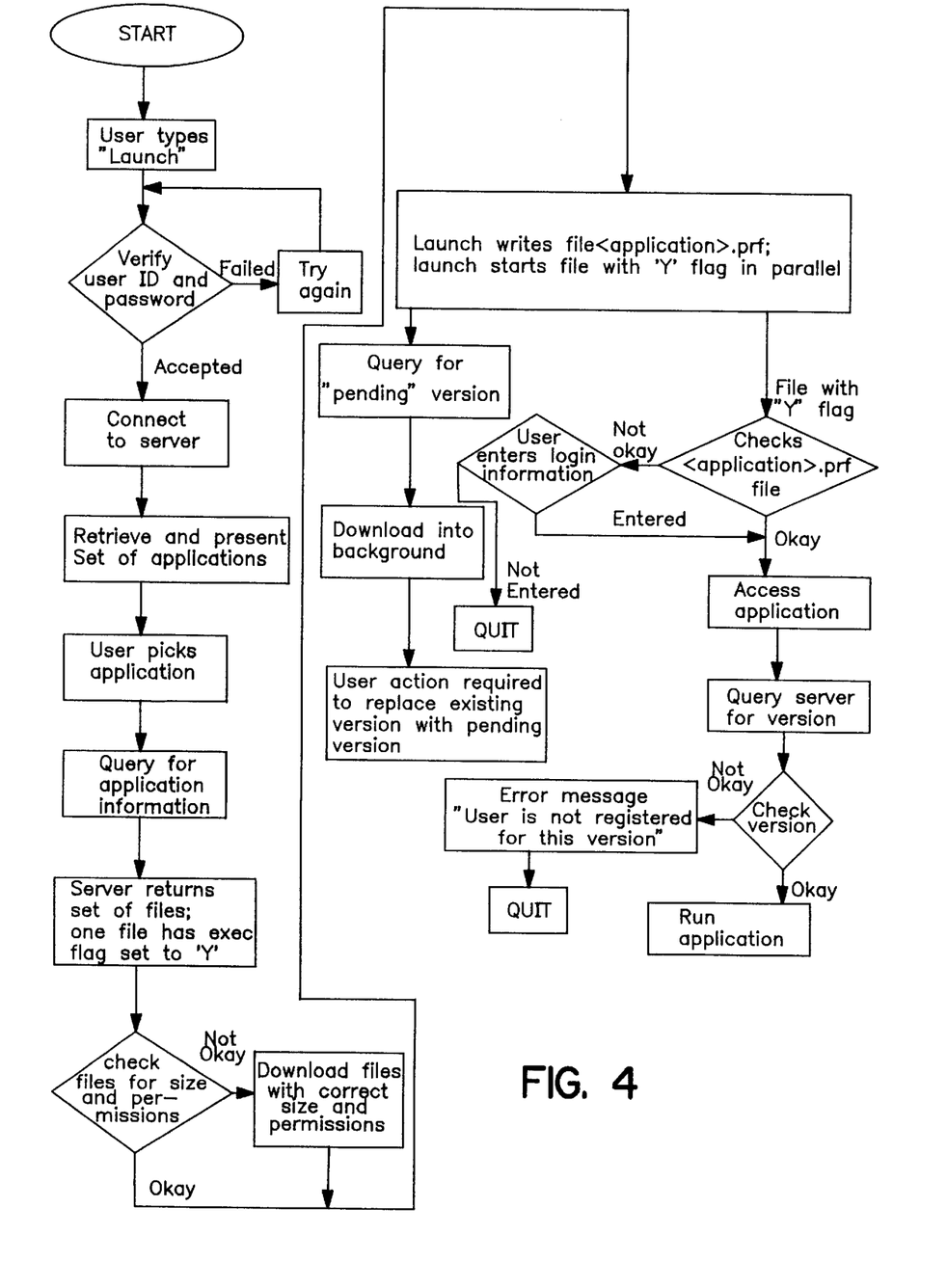
FIG. 4 is a flow chart illustrating, in a broad sense, the version control management from the point of a user starting an application.

Referring to FIG. 4, a user begins the application by typing "launch". This then brings up a logon screen and the user enters his logon information. The launch application then connects with the EXEC server which queries for the set of applications the user is registered to use and presents this set of applications to the user. Generally this is accomplished by using the user's ID and running a stored procedure which joins two tables, one which involves information about all applications and the other which includes information specific to the users. The user then chooses an application from the presented list. The launch application queries the server for application information and the server returns the set of files for the version which the user is registered to use.

One of the files is provided with a means for executing that file while the others will not be executed. For example, execute (EXEC) flags can be used to execute this file, while not executing the other files. In this embodiment, to execute this file, the EXEC flag is set to 'Y'. Typically, the file with the EXEC flag set to 'Y' sets up the environment (so that the desired application can find its support files) and then begins the execution of the desired application. Here, because the desired application is made up of many files, the Launch application needs to know which file to tell the operating system to execute. The other files are generally support files, used by the desired application for various purposes. Only the one file with the EXEC flag set to 'Y' is the "the file" to execute.

The launch application then checks all of the received files in the set for correct size and permissions. If a file(s) is of an incorrect size, incorrect permission or otherwise unacceptable, the launch application downloads from the server a new file(s) with the correct size and permissions. Each application that may be launched (by launch) is a separate, stand-alone application. It is preferred that each application have the ability to be executed independent of Launch, such that if Launch were to have a fatal bug, the required applications could still be run by directly executing the required applications.

It is preferred that each application must have the user's name and password in order to log into a database. Rather than requiring the user to log in multiple times (once each for Launch, the desired application, and any other application the user wishes to use), Launch writes the user's name and password in a file, here identified as the <application>.prf file. An application reads this file and uses it to log into the database. Thus, with Launch, the user is only required to log in once and does not have to keep logging in.

The launch application then writes file <application>.prf which preferably contains encoded user password and timestamp information. Preferably, this file is encoded to prevent other users from directly reading a user's password and contains a timestamp to prevent other users from using another user's .prf file to gain access to the database.

The launch application then starts the file with the 'Y' flag in parallel, i.e., this file runs in a non-blocking manner, i.e., the operating system will start the running of this file and return to the launch application without waiting for the completion of the running of the file.

The file with the 'Y' flag looks for, reads, decodes, and checks the <application>.prf file. If the <application>.prf file is not found, or if the timestamp is expired or corrupted, then it requires the user to login and provide the login information. If the <application>.prf file is okay, the file with the 'Y' flag begins execution of the desired application, the desired application is fully accessed, and the desired application queries the EXEC server for the application version that this user is supposed to be using and checks against the version currently being run. If the versions match, the running of the desired application continues. If the versions do not match, an error message is displayed and the desired application exits.

This provides that if a user, e.g., a sophisticated user, is able to access and use an application without using the launch application, that the user would be allowed to use the application only until a system administration personnel determines that the user should be using a new version and takes the steps necessary to assign the new version to the user. If a user were able to bypass launch, this would otherwise avoid the automatic download and update part of the system. This provides that even if a user is able to bypass launch, eventually they will be converted to the desired version of the application. Thus, a user cannot execute an out of date version which might possibly detrimentally effect the related databases.

Concerning the parallel running launch application, the launch application queries for a pending version. If a pending version exists, the launch application downloads the new version into the background of the user system. The new version is downloaded into the background because the downloading generally involves significant megabytes of data which could otherwise overload the system, particularly, if it is an application which many users are using, and because the downloading could take a significant amount of time which would hurt the productivity of the user.

The downloaded application preferably remains in the background until a system administration person decides that the applicable group should be using the new version. There are generally two reasons why it preferably takes user action to replace the old version with the new version and why this is not done automatically. First, the system may be used in a franchise arrangement. Usually, the franchisee likes to retain control of what version of an application is being used. Frequently, the franchisee will wait until he knows that another franchisee has tested the new version of the application and that it has worked satisfactorily. It is desirable that the franchisee retain the flexibility to operate either the old version or the new version.

Secondly, often there is a "cut over date", i.e., a specific date, when a new version of a database is to be released. Typically, it is desired to cut over related applications and databases at the same time. The applications can't precede the database or vice versa. Both the applications and the databases need to be released almost simultaneously. In this case, even though the new version of the application is available, its desired that the system personnel administrator would set the effective date for the user for the date when the new version is to be cut over.

VCMadmin is an application that inserts newly developed applications or versions into the system. The VCMadmin application provides a mechanism for presenting applications or new versions that are developed by developers to the users in an official way which maintains the ability to troubleshoot the application after its release. VCM provides a framework that the application developer takes advantage of to automate the process of building a control version and distributing it to the users. Generally, VCMadmin will only be used by Control Management (CM) personnel or by the individual developers.

Figure 5:
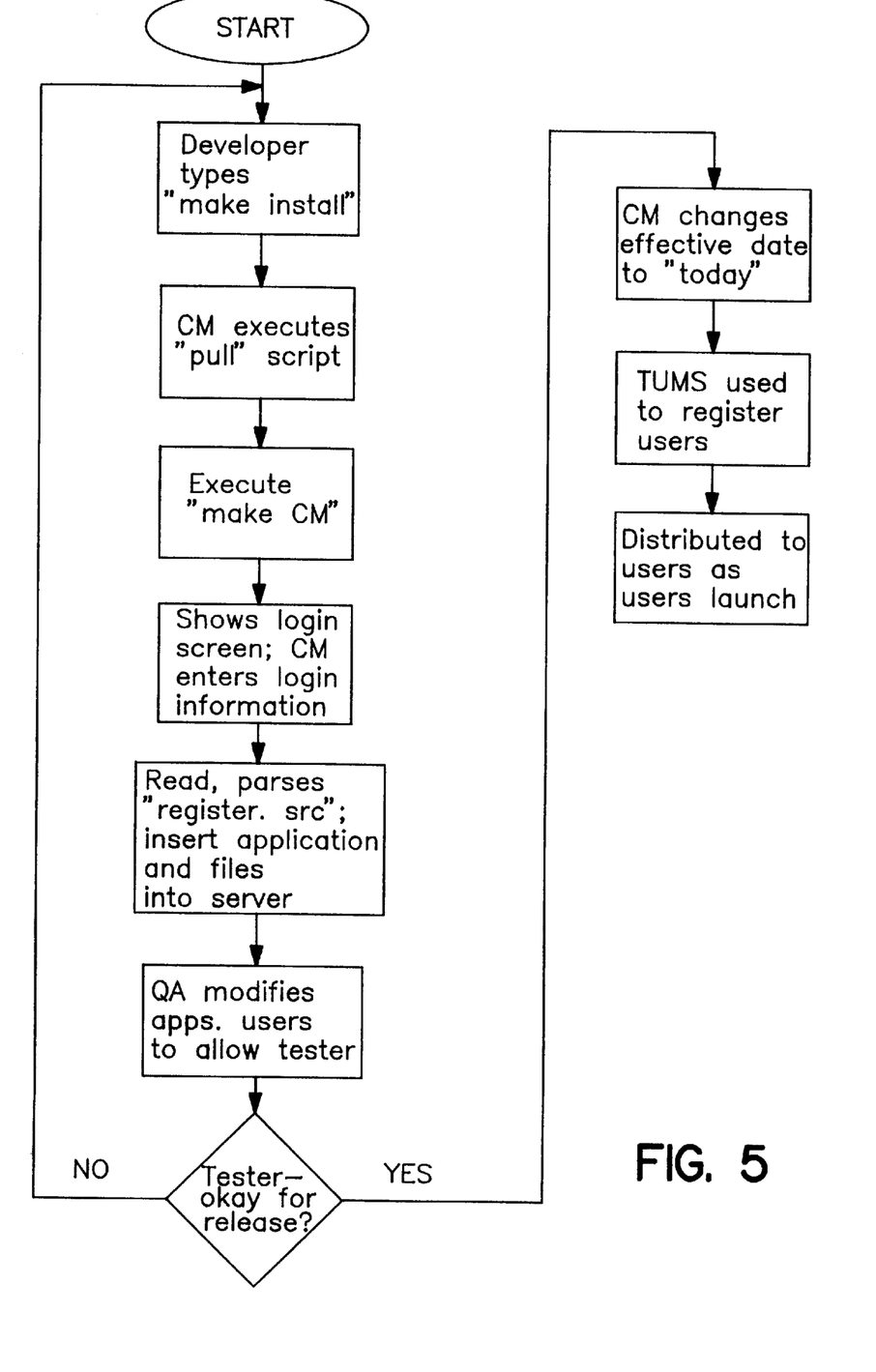
FIG. 5 is a flow chart illustrating, in a broad sense, the version control management system from the application development and version release standpoint.

FIG. 5 shows a flow diagram of the version control management from the standpoint of a developer developing a new version of an application. To initiate this, the developer types "make install", a utility program with the target install. The install target allows:

1. The building of the application.
2. The creating of a file that contains the entire release (a 'tar' file).
3. The mailing to a configuration management (CM) person informing him that a new release is available.

The 'tar' file (abbreviation of "tape archive—a UNIX utility) contains all of the source code, header, resource, stored procedure definitions, a makefile, README file, and any other files necessary for the application to build and execute. A tar file provides a file format whereby many files are concatenated together to form a single file. It is used to make moving a set of files around simpler and less error prone, since one needs to move only the tar file and "untar" it in order to get all of the files in the set.

The CM executes a "pull" script which:

1. copies the 'tar' file to a known area, and
2. uncompresses, "untars" the 'tar' file into a format which documents the file and which includes a human readable format.

The CM then executes "cm.sh", a script, which sets up the environment for the CM. The CM executes "make cm", a utility with a target "cm". The cm target:

1. Builds the executable, setting VCM flag.
2. Builds support files.
3. Executes VCMadmin-iregister.src.

Each application has an executable (sometimes called the program). In order for the application to behave as desired, it must be built in such a manner that the queries to ensure that the user is using the correct version of the application are enabled. This is done using a build flag (sometimes called a define), here called "VCM". Building of the application involves using the compiler to compile the header/source files into object files and the linker to link object files and library archives into an executable.

The support files include resource files, run files, and possibly other files depending upon the application. The creation of these files may involve third-party software or may be scripts that a developer has written.

The execution of VCMadmin-iregister.src leads into the next process step, insertion of the executable and its support files into the server. VCMadmin is an application and register.src is an argument to the application. The "-i" is a flag to indicate initialization.

The application then shows a login screen and the CM enters his login information to signal the application to continue. The application reads, parses register.src and inserts the application and support files into the EXEC server. Here, the CM will provide an effective date of the developed application far into the future to avoid any indication that this is a pending version.

Next, the CM informs quality assurance (QA) of this new version. The QA modifies the "apps.users" table using ISQL to allow a tester to test the new application. The tester gains access to the new version using the launch application as discussed above. The tester determines whether the new version is suitable for release to the field. If it is not, the developer may modify the program as discussed above. If it is suitable for release to the field, the CM changes the effective date to "today", then, through TUMS and the launch application, the new version is distributed to users pursuant to the launch application as discussed above. Here, a system personnel administrator uses TUMS to register users to use the new version. Then, when the users next launch, the new version is started.

As part of the new version installation, old versions should eventually be purged. However, early in the new version installation process, care should be taken to ensure that two versions, i.e., the new version and the just replaced version, are always available in the event that a catastrophic failure in the new version requires a "roll back" to the just replaced version.

The present invention, with TUMS (which utilizes a directed acyclic graph) and VCM, solves the problems mentioned above by providing a higher level of security, flexibility to allow permissions to users as desired, and a structure which allows the user to only see those application or stored procedures which the user is expected to use. The present invention also solves the problems mentioned above relating to users not using the correct version of an application by providing the launch application which ensures that users are using the desired version of an application. Further, the present invention overcomes shortcomings relating to developing new versions by providing a means to install a new version on the system and test it on the system prior to releasing it to the users.

Although the present invention has been described in detail, it should be understood that various changes, alterations, and substitutions may be made to the teachings herein without departing from the spirit and scope of the present invention as defined by the appended claims.

What is claimed is:

1. A method of controlling access to applications on a system having a data server, comprising the steps of:
   obtaining a user identification entered by a user;
   accessing a selected application on the data server;
   accessing a file having data comprising a directed acyclic graph structure, said directed acyclic graph structure having at least two levels of nodes, each node providing for indicating the grant or denial of permission to maintain access to a specific application;
   determining whether the user is authorized to maintain access to the selected application using the user identification;

obtaining a set of files for a version of the selected application that the user is permitted to use;

initiating the selected application using the files obtained; and checking for pending versions of the selected application during execution of the selected application.

2. A method of providing a user with a latest version of a selected application in a system having at least one data server, comprising the steps of:

obtaining a user identification entered by a user;

determining which applications the user is permitted to use;

obtaining a selection entered by the user of an application the user is permitted to use;

determining which version of the selected application the user is permitted to use;

obtaining a set of files for the version of the selected application that the user is permitted to use;

initiating the selected application using the set of files obtained; and checking for a version of the selected application that is more recent than the version of the selected application which has been initiated, wherein the step of checking is carried out during execution of the selected application.

3. The method of claim 2, comprising the step of downloading a new version of the selected application which is more recent than the version of the selected application which has been initiated.

4. The method of claim 3, wherein the new version of the selected application is downloaded in the background.

5. The method of claim 2, wherein the step of checking for a more recent version of the selected application is carried out by an application running in parallel with the selected application.

6. The method of claim 2, wherein the step of checking for a more recent version of the selected application is carried out by the selected application.

7. The method of claim 2, comprising the step of terminating access to the selected application if there is a version of the selected application which is more recent than the version of the selected application which has been initiated.

8. A method of developing a new version of an application on a system while an old version of the application is running on the system, wherein the system has at least one data server, comprising the steps of:

initiating a utility application on the data server;

building a new version of the application in the utility creating a tar file which contains the new version of the application;

copying the tar file to a predetermined area and in a predetermined format;

testing the new version of the application in the copied tar file; and releasing the tested new version of the application to a user, wherein the tar file contains a source code and a set of files for building and executing the new version of the application.

9. A method of developing a new version of an application and providing that a user uses the new version of the application when selected in a system having at least one data server, comprising the steps of:

creating a tar file which contains the new version of the application on at least one data server;

copying the tar file to a predetermined area in a predetermined format;

testing the new version of the application in the copied tar file;

obtaining a set of files for the new version of the application if the user is permitted to use the new version of the application;

initiating the application using the files obtained; and checking the initiated application for pending versions during execution of the initiated application.

10. A method of controlling user access to system resources, comprising the steps of:

obtaining an identification of a user;

obtaining a request of the user to initiate a resource access function for accessing a resource;

determining if the user is permitted to initiate the requested resource access function, including the sub-steps of:

accessing a directed acyclic graph structure, said directed acyclic graph structure having a plurality of capabilities arranged in a plurality of levels, wherein each capability of a lowest level represents a permission to perform a corresponding resource access function, wherein each capability of successively higher levels contains at least one capability of a preceding level, and wherein each capability of a highest level is granted to at least one user, and using the identification of the user to determine which capabilities the user is granted in accordance with the directed acyclic graph structure; and performing the requested resource access function if it is determined that the user is permitted to initiate the requested resource access function.

11. The method of claim 10, wherein there are at least two users and the users are grouped into at least two groups and wherein at least one capability is granted to each group in accordance with the directed acyclic graph structure.

12. The method of claim 11, wherein information relating to the groups of users is included in a group table and information relating to the directed acyclic graph structure is included in a directed acyclic graph table.

13. The method of claim 11, wherein each user is a member of one group.

14. The method of claim 10, wherein a capability of a given level contains two capabilities of an immediately lower level.

15. The method of claim 10, wherein the resource is a database.

16. The method of claim 10, wherein the resource access function includes reading data in the database.

17. The method of claim 10, wherein the resource access function includes writing data to the database.

* * * * *